Aug. 7, 1951                    P. W. ENSIGN                    2,563,228
        ACCELERATING DEVICE FOR GAS PRESSURE REGULATORS
                    USED IN ENGINE FEED SYSTEMS
                        Filed Aug. 7, 1948
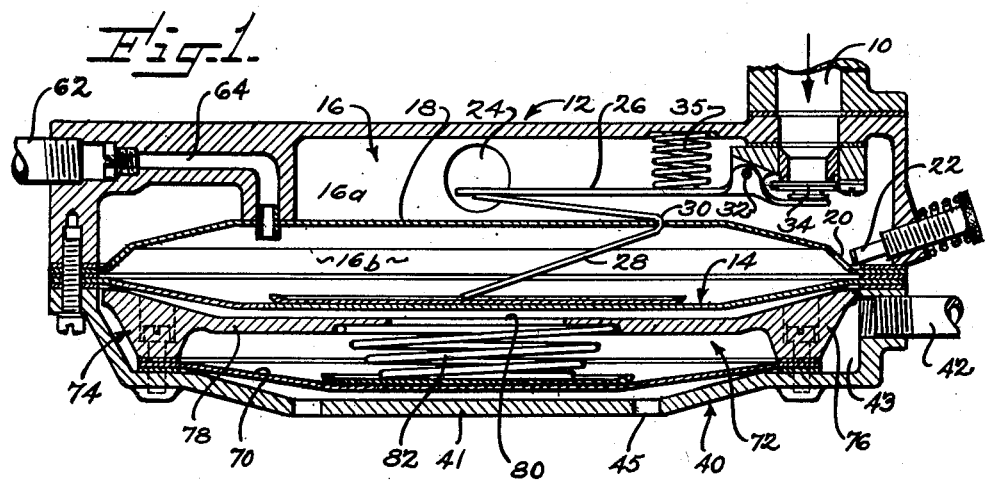
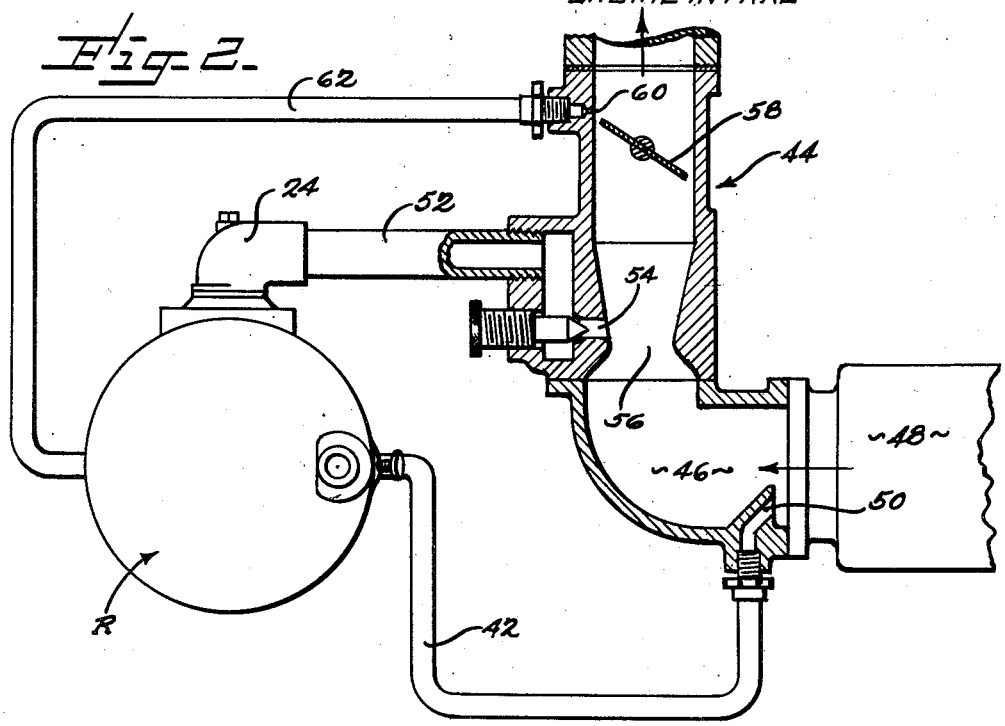
Inventor
Paul W. Ensign
Barkelew & Scantlebury
Attys.

Patented Aug. 7, 1951

2,563,228

UNITED STATES PATENT OFFICE 2,563,228

ACCELERATING DEVICE FOR GAS PRESSURE REGULATORS USED IN ENGINE FEED SYSTEMS

Paul W. Ensign, San Marino, Calif., assignor to Ensign Carburetor Company, Huntington Park, Calif., a corporation of California Application August 7, 1948, Serial No. 43,034

9 Claims. (Cl. 48—180)

This invention has reference to gas fuel feed systems such as are typically used for feeding gaseous fuel to internal combustion engines or other fuel consuming devices where the fuel demand may vary widely and rapidly. The utility of the invention is not necessarily limited to fuel feed systems for engines, but the invention will be explained most readily with reference to such use.

In gaseous fuel feed systems which are in common use for feeding automotive engines, the systems commonly comprise a fuel pressure regulator, with or without a heater to maintain fuel vaporization; the regulator taking its supply of fuel from a source under relatively high pressure and delivering the fuel at a regulated low pressure (commonly at about or somewhat under atmospheric pressure) to the carburetor or mixing valve in which the fuel is mixed with air and introduced to the engine intake. The regulator may be of the single stage or multiple stage type. In either instance, the reference pressure for the stage which finally delivers the fuel to the carbureter is commonly derived from the instantly existing air pressure in the carburetor air intake, in order to maintain a uniform or properly controlled relation between the effective air pressure and the fuel pressure in the carbureter. For the purpose of maintaining such pressure relations a so-called balance tube is commonly used to transmit the air intake pressure to the reference pressure chamber of the regulator.

In practice, such a balance tube is commonly of relatively small diameter and sometimes quite long. Upon rapid acceleration of an engine by opening the throttle, with accompanying rapid increase of air velocity through the air intake and venturi, the drop in pressure at the fuel nozzle is quite abrupt. That drop in pressure is transmitted to the low pressure delivery chamber of the regulator and tends to move the pressure controlling diaphragm to keep the delivery pressure up. In order to supply the carbureter with the necessary increased volume of fuel under the proper pressure during such abrupt changes in operation, the controlling regulator diaphragm should be able to move rapidly to open the regulator valve to keep the fuel pressure up. That particular movement of the diaphragm is a movement inwardly into the low pressure chamber of the regulator and away from the balance pressure chamber through which the reference pressure is applied to the controlling diaphragm. In case of rapid deceleration by closing the throttle the pressure tends to build up and the diaphragm must move in the opposite direction. And in practice it has been found, particularly where the air intake and fuel nozzle pressures vary abruptly because of the use of air cleaners, and particularly also where the regulator diaphragms are large, air cannot move rapidly enough through the balance tube to allow the controlling diaphragm to move rapidly enough in its valve operating movements.

The general purpose and objective of the invention is to provide means for overcoming those difficulties and for allowing rapid controlling movements of the controlling diaphragm in systems such as above described where the reference pressure on the diaphragm is applied through a restricted passage such as a balance tube. The manner in which the invention accomplishes its purpose, and the invention itself will be best understood from the following detailed description of a preferred form of the invention applied to a typical engine feed system. For that purpose reference is had to the accompanying drawings in which:

Fig. 1 is a section illustrating the essentials of a regulator with the invention in its preferred form applied thereto; and Fig. 2 is a schematic view showing an engine feed system utilizing the regulator devices shown in Fig. 1.

In Fig. 1 a typical pressure regulator is illustrated in the form of a single stage regulator having its initial high pressure intake at 10. This high pressure intake may either be directly from a supply of gaseous or volatile fuel, such as a butane tank, or this initial intake may be from a preceding regulator stage or stages, as it is in a multiple stage regulator. The regulator as illustrated has a main casing 12 which, with the controlling diaphragm 14, encloses a low pressure chamber 16. In the particular design here illustrated, low pressure chamber 16 is divided into two parts 16a and 16b by an intermediate wall 18, with the two chamber parts restrictedly in communication through an opening 20, the effective size of which may be adjusted and regulated by the adjustable pin 22. The final low pressure outlet 24 leads from chamber portion 16a which is enclosed by main casing 12 and the intermediate wall 18. Diaphragm 14 and intermediate wall 18 enclose the other portion 16b of the low pressure chamber. The purpose of the intermediate wall with its adjustably restricted opening is, among other things, to prevent small or periodic variations in the outlet pressure from constantly moving the diaphragm.

As here illustrated diaphragm 14 is functionally connected with valve lever 26 through the medium of a member 28 shaped more or less like a hairpin and pivoted at 30 where its bend passes loosely through wall 18. Valve lever 26 is pivoted at 32 and carries at its end the valve 34 which controls the inlet 10. In this particular regulator, which is designed more specifically as the second stage of a two-stage regulator and is intended to open and normally to operate at slightly sub-atmospheric pressure, valve spring 35 tends to close valve 34 with an appropriate force. In the regulator as shown in the drawings the arrangement is such that when the outlet pressure in chamber 16 falls, diaphragm 14 moves up and opens control valve 34 more widely; and that when the outlet pressure increases, diaphragm 14 moves down to close the valve and thus compensate for the increased outlet pressure.

Commonly such a regulator, either as a single stage or as a final stage of a multiple stage regulator, will be supplied with a balance chamber casing 40 which encloses a reference pressure chamber on the outer face (here the lower face) of diaphragm 14. Such a reference pressure chamber may either be open to atmospheric pressure or, preferably, is completely closed except for its communication with the carburetor air intake through a balance tube such as shown at 42.

Fig. 2 schematically shows a typical installation, illustrating the simple essentials of a typical form of carbureter 44 having an air intake 46 equipped with an air cleaner 48. Balance tube 42 is illustrated as picking up the total effective air pressure in the intake through a Pitot tube formation 50 which faces upstream (against the air current) in the air intake. In this figure the typical regulator of Fig. 1 is diagrammatically illustrated as the unit R, with its low pressure delivery outlet 24 connected by tube 52 with the adjustable fuel feed orifice 54 which delivers fuel to the throat of the carbureter venturi 56. The usual controlling throttle is shown at 58. An idling control orifice is shown at 60 in the wall of the carbureter just above the throttle, in a position where it is subjected more or less directly to engine suction when the throttle is closed to an idling position such as illustrated. The somewhat increased depression which is thus applied to idling orifice 60 is transmitted via tube 62 to the regulator for modifying its action to increase the fuel delivery pressure during idling. As shown in Fig. 1, tube 62 communicates with a passage 64 which in turn communicates with low pressure sub-chamber 16b which lies between intermediate wall 18 and diaphragm 14. The restricted communication between sub-chamber 16b and sub-chamber 16a allows of the maintenance of a somewhat lower pressure in the chamber 16b than in 16a, and this operates to temporarily maintain in the final delivery sub-chamber 16a a somewhat higher delivery pressure during idling.

Several of the particular features and arrangements which have so far been described as constituting a typical fuel feed regulator system are of no consequence with relation to the present invention, but have been described merely for the purpose of showing how my present invention is applied to a typical regulator and regulator system which is now in common use. As will be understood from what follows, my invention is applicable to any regulator which has a pressure controlling diaphragm or equivalent exposed on one face to delivery pressure. And it is also to be noted that other pressure responsive elements such as pistons and sylphons are recognized in the regulator art as equivalents of diaphragms and are therefore to be included in the term as I use it.

The invention itself comprises the means, now to be described in typical and preferred form, which allows rapid movements of the pressure controlling diaphragm in a situation where, as described, those rapid movements would otherwise be impeded by slow movement of air through a passage such as the balance tube.

As applied to the described regulator in preferred form, my invention utilizes a compensating diaphragm 70 which is mounted in opposition to the outer (here the under) face of regulating diaphragm 14 in such a manner that reference chamber 72 is enclosed in the structure between the two diaphragms and is in communication with balance tube 42. Specifically, but merely preferably, the arrangement may be as now described. The outer peripheral edge of compensating diaphragm 70 is clamped between the inner face of wall 41 of casing 40 and a member 74 which serves several purposes. As here illustrated member 74 is composed of an outer annulus 76 and a web 78, diaphragm 70 being clamped under the annulus 76 and web 78 being spaced from wall 41 of casing 40. The upper face of member 74 is shaped and is located to conveniently form the lower or outer limit to the outward (downward) movement of regulator diaphragm 14. As illustrated, web 78 has a comparatively large opening 80 at its center, so that the web does not effectively divide the chamber 72 between the two diaphragms into two sub-chambers. The web also conveniently provides a seat for a light compression spring 82 which normally presses diaphragm 70 away from diaphragm 14 and toward wall 41. All of the functions of web 78 could be performed if, for instance, it were in the form of a spider. And, as will be seen from a consideration of the operational functions to be described, it is not at all necessary that the member which clamps the periphery of diaphragm 70 (here that member is the annulus 76) be integral with web 78 or its equivalent. It is only necessary that diaphragm 70 be edge-clamped in such manner that a closed chamber is formed between it and diaphragm 14 and that preferably a limiting back wall be provided to prevent the rupture of regulator diaphragm 14 in case it should accidentally be subjected to uncontrolled high pressure from the high pressure inlet.

In the specific preferred design here illustrated balance tube 42 enters the peripheral wall of casing 40 and communicates first with the annular chamber 43 which lies outside the annulus 76. The upper outer edge of annulus 76 is spaced inwardly from the wall of chamber 40 and downwardly from regulator diaphragm 14, so that balance communication is had over that edge into the space immediately below diaphragm 14 and, through the opening 80, freely with the whole of chamber 72 which is enclosed between the two diaphragms. The back or bottom wall 41 of casing 40 is provided with suitable opening or openings 45 through which the outer or lower face of compensating diaphragm 70 is subjected to atmospheric pressure as shown here, or to any other suitable constant pressure. It is only necessary that no small closed chamber be formed below compensating diaphragm 70. The whole of wall 41 below diaphragm 70 could be open to atmosphere except for the desirable physical protection which that wall gives the diaphragm.

Spring 82 is preferably just strong enough to hold diaphragm 70 normally in an outward position when the carbureter and regulator are operating in the ranges from which acceleration is to be accommodated, so that the diaphragm is capable of moving inward when acceleration takes place and regulating diaphragm 14 moves inward toward its low pressure chamber. Preferably the spring is just strong enough to hold diaphragm 70 at or near the outer limit of its movement; in the specific form here illustrated, at or near the casing wall 41, during such ranges of operation. Those ranges are usually the lower ones; or at least it may be said that the lower ranges of operation present most sharply the acceleration difficulties of which I speak. For descriptive purposes, but without implied limitation, I shall therefore describe the design and functioning of my invention with those operating ranges in mind.

Assuming that the outer face of diaphragm 70 is open to atmosphere, the spring pressure exerted on the diaphragm depends on the normal operating depression which is picked up in the air intake by the balance tube under those low conditions of operation. The spring pressure thus depends largely on the characteristics or condition of the air cleaner if one is used. For instance, if no air cleaner is used and the Pitot tube faces upstream, pressure in the balance chamber between the two diaphragms will be substantially atmospheric at the lower operating ranges and the spring can be very weak. Also the spring is advantageously quite soft (of low spring rate) so as to least impede the inward (upward) movement of diaphragm 70 with diaphragm 14 when the pressure falls in the low pressure chamber above diaphragm 14. As will be understood from the operating functions described below, the sole purpose of the spring (or equivalent means of applying yielding force to diaphragm 70) is to normally hold diaphragm 70 outwardly, in a position spaced from any member like 78 which may limit its inward movement, when the carbureter and regulator are operating in the ranges from which acceleration commonly takes place; and to restore diaphragm 70 to that position when the operation falls to those ranges. It is desirable that diaphragm 70 should be as nearly as practicable in a floating condition, provided only that it is held normally in an outer position so that it can move inwardly on abrupt increase of the operating range of the carbureter and regulator. A very weak spring will suffice if the frictional losses of air pressure in the air intake are low. If an air cleaner imposes substantial frictional resistance, then the spring must be correspondingly stronger to maintain diaphragm 70 in its normal position.

Assuming the parts to be in or about the illustrated positions during operation in the ranges from which acceleration is to be accommodated, the action on acceleration is as follows. When the throttle is opened, air velocity through the venturi increases, with resultant increase of depression at the fuel nozzle and decrease of pressure in the low pressure delivery chamber of the regulator. That pressure decrease on the inner (upper) face of regulating diaphragm 14 tends to move the diaphragm up, to open the regulating valve and maintain the delivery pressure to satisfy the increased fuel demand. By my invention the regulating diaphragm is allowed to move up relatively freely. Due to the fact that the two diaphragms 14 and 70 form walls of the same chamber 72, and that the resistance to upward inward movement of 70 is very slight, the two diaphragms in effect move upwardly together without any substantial change of the volume of the chamber between them and thus without demanding any substantial air flow through the balance tube. As soon as the regulator diaphragm and valve stabilize in their new position of equilibrium, spring 82 moves the compensating diaphragm 70 back toward but not necessarily to its normal position. That outward movement is slow because the spring is weak, and thus does not require any fast air flow through the balance tube.

Similar but opposite action will take place on sudden deceleration from a higher operating range to a lower one. At higher operating ranges diaphragm 70 will normally occupy a position inward (upward) of its position for lower operating ranges. This is due to greater frictional losses in the pressure applied to chamber 72, due to increased air velocity in the carbureter. Assuming any given over-all movement of diaphragm 70 to accommodate the maximum movement range of diaphragm 14, spring 82 may be designed so as to hold diaphragm 70 outward at low operating ranges but in a medial or inward position at high operating ranges when the reference pressure in chamber 72 is lower. From such an inward or medial position diaphragm 70 can then freely move outward with regulating diaphragm 14 when that diaphragm moves outward to close the regulator valve on deceleration. And, for accommodating slight or moderate decelerations from comparatively low operating ranges, it may be preferable that the spring hold diaphragm 70 not at its outer limit but somewhat inside that limit at the lower operating ranges.

Thus the regulating diaphragm is subject at all times to the reference pressure transmitted to it by the balance tube but is substantially fully free to move when acceleration or deceleration conditions are imposed. Changes in the pressure transmitted from the air intake by the balance tube during acceleration and deceleration are relatively slight and require only slow movements of air through the tube to satisfy them.

Several general observations may be made. Spring 82 is typical of any yielding means associated with diaphragm 70 tending to bias it outwardly. That means might be for instance a weight; or it could be a biasing in the diaphragm itself. Or the outward biasing of the diaphragm could be obtained by applying a constant sub-atmospheric pressure between the diaphragm and casing wall 41 which would in that instance be imperforate. Like the spring, the diaphragm should be as soft as practicable. Diaphragm 70 need not be positioned in spacial opposition to 14; it is only necessary that the two diaphragms form walls of the reference pressure chamber. Nor is it necessary that the two diaphragms be of any particular relative size; if 70 is, for instance, smaller than 14 it merely has to move further than 14.

In the above description, spring 82 is described as a means for biasing diaphragm 70 outwardly, because in the typical embodiment of the invention here shown as an illustration the reference pressure in chamber 72 is normally less than the atmospheric pressure acting on the outer face of the diaphragm. If the reference pressure in chamber 72 were higher than atmospheric pressure, as would be the case, for example, if a supercharger were used to supply air to passage 46, the differential pressure normally acting on diaphragm 70 would be outward. The same would be true, for example, with a sub-atmospheric pressure in reference pressure chamber 72, as in the illustrated embodiment, if the outer face of the compensating diaphragm were exposed to a still lower sub-atmospheric pressure. The equivalent of spring 82 under such conditions would be means for exerting inwardly directed force on diaphragm 70. The general function of biasing means 82 is to maintain diaphragm 70 floating more or less freely under normal operating conditions in spite of whatever differential pressure may then be applied to the diaphragm faces. In particular, if the pressures are normally approximately equal on both faces of the compensating diaphragm, the pressures themselves may be considered to constitute a biasing means.

The following statements define and claim my invention in its several novel aspects.

A. The invention relates to gaseous fuel feed systems for feeding fuel at varying rates, such systems being of the type which includes:

(a) a gas and air mixer which has a gas and an air intake;

(b) a gas pressure regulator having a valve-controlled high pressure inlet, a pressure regulating diaphragm which forms one wall of a low pressure delivery chamber and which controls the valve, and structure forming a reference pressure chamber of which the regulating diaphragm forms one wall;

(c) a passage connection between the delivery chamber of the regulator and the gas intake of the mixer; and (d) a balance passage connection between the air inlet of the mixer and the reference pressure chamber.

B. The invention also relates to gas pressure regulators of the type which includes:

(a) a casing structure;

(b) a pressure regulating diaphragm forming one wall of a low pressure delivery chamber, other walls of which are formed by the casing structure, the inner face of the diaphragm being exposed to the pressure in that chamber; and (c) a high pressure inlet to the delivery chamber and a diaphragm controlled valve controlling that inlet.

In such systems and in such regulators as defined in (A) and (B) above, my invention comprises the improvements which are defined in any or all of the following numbered claims.

I claim:

1. In gaseous fuel feed systems for feeding fuel at varying rates, said systems being of the type which includes a gas and air mixer which has a gas and an air intake, a gas pressure regulator having a valve-controlled high pressure inlet leading to a low pressure delivery chamber, a pressure regulating diaphragm which forms one wall of the low pressure delivery chamber and which controls the valve, structure forming a reference pressure chamber of which the regulating diaphragm forms one wall, a passage connection between the delivery chamber of the regulator and the gas intake of the mixer, and a balance passage connection between the air inlet of the mixer and the reference pressure chamber; the improvement which comprises, a compensating diaphragm forming another wall of the reference-pressure chamber, exposed on its inner face to the reference pressure and exposed on its face opposite the reference chamber to a substantially constant pressure, and means applying a yielding force to the compensating diaphragm tending to hold that diaphragm floatingly in an equilibrium position under the forces applied to it.

2. In gaseous fuel feed systems for feeding fuel at varying rates, said systems being of the type which includes a gas and air mixer which has a gas and an air intake, a gas pressure regulator having a valve-controlled high pressure inlet leading to a low pressure delivery chamber, a pressure regulating diaphragm which forms one wall of the low pressure delivery chamber and which controls the valve, structure forming a reference pressure chamber of which the regulating diaphragm forms one wall, a passage connection between the delivery chamber of the regulator and the gas intake of the mixer, and a balance passage connection between the air inlet of the mixer and the reference pressure chamber; the improvement which comprises, a compensating diaphragm forming another wall of the reference-pressure chamber, exposed on its inner face to the reference pressure and exposed on its face opposite the reference chamber to a substantially constant pressure, and yielding means associated with the compensating diaphragm tending to move that diaphragm outwardly with relation to the reference-pressure chamber.

3. The improvement in gaseous fuel feed systems, as defined in claim 2, and including also structure which limits the movement of the compensating diaphragm outwardly with reference to the reference-pressure chamber, the yielding means which is associated with the compensating diaphragm exerting such force as to hold that diaphragm at or near its outer limiting position against the action of the reference pressure when the mixer and regulator are operating in their lower capacity ranges.

4. The improvement in gaseous fuel feed systems defined in claim 2 and in which the structure forming the reference pressure chamber includes casing structure which partially encloses the reference chamber at the outer face of the pressure regulating diaphragm, the compensating diaphragm which forms a wall of that chamber being located in substantially parallel and spaced opposition to the outer face of the regulating diaphragm, structure within the reference pressure chamber between the two diaphragms forming an outward limiting seat for the regulating diaphragm and from which the compensating diaphragm is normally spaced, and the yielding means which is associated with the compensating diaphragm comprising a spring seated on said inter-diaphragm structure and pressing outwardly against the compensating diaphragm.

5. In gas pressure regulators of the type which includes a casing structure, a pressure regulating diaphragm forming one wall of a low pressure delivery chamber, other walls of which are formed by the casing structure, the diaphragm being exposed on its inner face to the pressure in that chamber, and a high pressure inlet to the delivery chamber and a valve controlled by the diaphragm and controlling that inlet; the improvement which comprises structure including a compensating diaphragm forming a reference pressure chamber at the outer face of the pressure regulating diaphragm, the face of the compensating diaphragm which faces inwardly toward the reference pressure chamber being exposed to the reference pressure therein and the face which is opposite the reference chamber being exposed to a substantially constant pressure, a reference pressure passage connecting with the reference pressure chamber, and means applying a yielding force to the compensating diaphragm tending to hold that diaphragm floatingly in an equilibrium position under the forces applied to it.

6. In gas pressure regulators of the type which includes a casing structure, a pressure regulating diaphragm forming one wall of a low pressure delivery chamber, other walls of which are formed by the casing structure, the diaphragm being exposed on its inner face to the pressure in that chamber, and a high pressure inlet to the delivery chamber and a valve controlled by the diaphragm and controlling that inlet; the improvement which comprises structure including a compensating diaphragm forming a reference pressure chamber at the outer face of the pressure regulating diaphragm, the face of the compensating diaphragm which faces inwardly toward the reference pressure chamber being exposed to the reference pressure therein and the face which is opposite the reference chamber being exposed to a substantially constant pressure, a reference pressure passage connecting with the reference pressure chamber, and yielding means associated with the compensating diaphragm tending to move that diaphragm outwardly with relation to the reference-pressure chamber.

7. The improvement in gas pressure regulators defined in claim 6, and in which the structure forming the reference pressure chamber includes casing structure which at least partially encloses the reference chamber at the outer face of the pressure regulating diaphragm, the compensating diaphragm which forms a wall of that chamber being located opposite the pressure regulating diaphragm, structure within the reference pressure chamber between the two diaphragms forming an outward limiting seat for the pressure-regulating diaphragm and normally spaced from the inner face of the compensating diaphragm, and the yielding means which is associated with the compensating diaphragm tending to move it outwardly away from said limiting structure.

8. The improvement in gas pressure regulators defined in claim 6, and in which the structure forming the reference pressure chamber includes casing structure which at least partially encloses the reference chamber at the outer face of the pressure regulating diaphragm, the compensating diaphragm which forms a wall of that chamber being located opposite the pressure regulating diaphragm, the compensating diaphragm being exposed on the face opposite the reference chamber to atmospheric pressure, and the yielding means which is associated with the compensating diaphragm tending to maintain it in an intermediate position against the pressure differential on its two faces.

9. The improvement in gas pressure regulators defined in claim 6, and in which the structure forming the reference pressure chamber includes casing structure which at least partially encloses a reference pressure chamber at the outer face of the pressure regulating diaphragm, the compensating diaphragm which forms a wall of the reference-pressure chamber being located in substantially parallel and spaced opposition to the pressure regulating diaphragm and being exposed to atmospheric pressure on its outer face, structure within the reference pressure chamber between the two diaphragms forming an outward limiting seat for the pressure-regulating diaphragm and normally spaced from the inner face of the compensating diaphragm, and the yielding means associated with the compensating diaphragm comprising a light compression spring of low compression rate interposed between said limiting structure and the compensating diaphragm tending to move that diaphragm outwardly away from the pressure regulating diaphragm.

PAUL W. ENSIGN.

REFERENCES CITED

The following references are of record in the file of this patent:

UNITED STATES PATENTS

| Number | Name | Date |
|---|---|---|
| 2,343,765 | Garretson | Mar. 7, 1944 |